United States Patent [19]

Ohmori

[11] Patent Number: 5,452,013
[45] Date of Patent: Sep. 19, 1995

[54] VERTICAL FILTER CIRCUIT FOR PRODUCTION OF SUB-PICTURE

[75] Inventor: Junichi Ohmori, Kanagawa, Japan

[73] Assignee: NEC Corporation, Japan

[21] Appl. No.: 324,388

[22] Filed: Oct. 17, 1994

Related U.S. Application Data

[63] Continuation of Ser. No. 11,680, Feb. 1, 1993, abandoned.

[30] Foreign Application Priority Data

Feb. 21, 1992 [JP] Japan .................................. 4-035388

[51] Int. Cl.⁶ ............................................. H04N 5/45
[52] U.S. Cl. .................................... 348/568; 348/565
[58] Field of Search ............................... 348/565–568; H04N 5/45

[56] References Cited

U.S. PATENT DOCUMENTS

| 4,282,546 | 8/1981 | Reitmeier | 358/183 X |
| 4,665,439 | 5/1987 | Naimpally | 358/183 |
| 4,768,093 | 8/1988 | Prodan | 358/140 X |
| 4,890,162 | 12/1989 | McNeely et al. | 358/180 X |
| 5,144,437 | 9/1992 | Miyauchi | 358/183 |

FOREIGN PATENT DOCUMENTS

| 353803 | 2/1990 | European Pat. Off. | H04N 5/45 |
| 0573280 | 12/1993 | European Pat. Off. | H04N 5/45 |
| 0601819 | 6/1994 | European Pat. Off. | H04N 5/45 |
| 1326386 | 8/1973 | United Kingdom | 358/140 |

Primary Examiner—James J. Groody
Assistant Examiner—Cheryl Cohen
Attorney, Agent, or Firm—Laff, Whitesel, Conte & Saret, Ltd.

[57] ABSTRACT

A vertical filter circuit comprises a first shifter connected to an S/P converter, a calculation circuit connected to the first shifter and a second shifter, a buffer memory connected to the calculation circuit, first and second delay circuits each connected to the calculation circuit, and a second shifter connected to the first and second delay circuits. The first delay circuit comprises a first write selector, a first line memory, and a first read selector, all of which are connected in series. The second delay circuit comprises a second write selector, a second line memory, and a second read selector, all of which are connected in series.

5 Claims, 2 Drawing Sheets

VERTICAL FILTER CIRCUIT FOR PRODUCTION OF SUB-PICTURE

This application is a continuation of application Ser. No. 08/011,680, filed Feb. 1, 1993 now abandoned.

BACKGROUND OF THE INVENTION

The present invention relates to a vertical filter circuit which is employed in a television receiver, a video tape recorder or a like apparatus having the picture-in-picture function of displaying a main picture together with one or more inserted sub-pictures.

In order to produce a sub-picture obtained by the reduction of an original picture at a predetermined reduction ratio, a television receiver having the picture-in-picture function comprises, as shown in FIG. 1, a matrix circuit 11, an analog-to-digital converter (an A/D converter) 12, a serial-to-parallel converter (an S/P converter) 13 and a vertical filter circuit 20. Here, a video signal of the original picture is inputted into the matrix circuit 11 as a brightness signal Y and two color difference signals R-Y, B-Y. The matrix circuit 11 comprises one clamping circuit and three multiplexers, and samples a brightness signal Y received from a Y/C separation circuit (not shown) and two color difference signals R-Y, B-Y received from a color demodulation circuit (not shown) at a predetermined clock timing to fetch the video signal as an internal signal. That is, in the matrix circuit 11, the brightness signal Y is clamped to a predetermined clamp level by the clamping circuit and then sampled at a clock timing of 9 MHz by one of the multiplexers while two color difference signals R-Y, B-Y are clamped to a predetermined clamp level by the clamping circuit and then sampled at a clock timing of 2.25 MHz by the respective remaining multiplexers. Consequently, the video signal is fetched as an internal signal, each unit of which consists of signals for eight picture elements including brightness signals Y for four picture elements, one color difference signal R-Y for one picture element and another color difference signal B-Y for one picture element. For example, a serial video signal, one unit of which consists of (Y)-(R-Y)-(Y)-(blank)-(Y)-(B-Y)-(Y)-(blank) for eight picture elements, is outputted from the matrix circuit 11 to the A/D converter 12. The A/D converter 12 samples the serial video signal with a sampling clock of 18 MHz to convert the serial video signal into a digital serial video signal. The S/P converter 13 converts the digital serial video signal which is received from the A/D converter 12 into a digital parallel video signal. That is, when the digital serial video signal is inputted from the A/D converter 12 to the S/P converter 13, for example, in the order of (Y)-(R-Y)-(Y)-(blank)-(Y)-(B-Y)-(Y)-(blank), the digital serial video signal is converted into one digital parallel video signal of (Y, R-Y, Y) and another digital parallel video signal of (Y, B-Y, Y).

The vertical filter circuit 20 comprises a shifter 10 21 connected to the S/P converter 13, first to third delay circuits $30_1$–$30_3$ connected to the S/P converter 13, a calculation circuit 22 connected to the shifter 21 and the first to third delay circuits $30_1$–$30_3$, and a buffer memory 23 connected to the calculation circuit 22. The first delay circuit $30_1$ comprises a first write selector $31_1$, a first line memory $32_1$, a first read selector $33_1$ and a first shifter $34_1$ which are connected in series. The second delay circuit $30_2$ comprises a second write selector $31_2$, a second line memory $32_2$, a second read selector $33_2$ and a second shifter $34_2$ which are connected in series. The third delay circuit $30_3$ comprises a third write selector $31_3$, a third line memory $32_3$, a third read selector $33_3$ and a third shifter $34_3$ which are connected in series.

The shifter 21 comprises a shift register and shifts the digital parallel video signal received from the S/P converter 13 the number of bit positions corresponding to the reduction ratio of the sub-picture in order to allow the averaging process which is required when the sub-picture is to be produced. Each of the write selectors $31_1$–$31_3$ comprises the number of clocked inverters equal to the number of bits of the digital parallel video signal, and only one of the write selectors $31_1$–$31_3$ is selected in accordance with a write select signal (not shown) inputted from the outside. Each of the line memories $32_1$–$32_3$ is used to store therein the digital parallel video signal for one scanning line received from the S/P converter 13 by way of the corresponding write selector of the write selectors $31_1$–$31_3$. Each of the read selectors $33_1$–$33_3$ comprises the number of clocked inverters equal to the number of bits of the parallel signal, and only one of the read selectors $33_1$–$33_3$ is selected in accordance with a read select signal (not shown) inputted from the outside. Each of the shifters $34_1$–$34_3$ comprises a shift register and shifts the digital parallel video signal received from the corresponding line memory of the line memories $32_1$–$32_3$ by way of the corresponding read selector of the read selectors $33_1$–$33_3$ the number of bit positions corresponding to the reduction ratio of the sub-picture in order to allow the averaging process. The calculation circuit 22 is used to effect the calculation necessary for the production of image data for the sub-picture using the digital parallel video signals which are received from each of the shifters 21 and $34_1$–$34_3$. The buffer memory 23 is used to temporarily store the image data for the sub-picture which is outputted from the calculation circuit 22.

Next will be described the operation using the vertical filter circuit 20 for producing a sub-picture reduced to one ninth in size.

In order to produce image data for a sub-picture reduced to one ninth in size in relation to the vertical direction of the screen, one scanning line should be extracted from every three adjacent scanning lines. However, the simple extraction of one scanning line from every three adjacent scanning lines will result in the deterioration of the picture quality of the sub-picture. Accordingly, a common practice is to effect an averaging process for every three successive scanning lines to extract a single scanning line. That is, where a first digital parallel video signal of the first one of three successive scanning lines on the screen is represented by "$L_{n-1}$", a second digital parallel video signal of the second scanning line by "$L_n$" and a third digital parallel video signal of the third scanning line by "$L_{n-1}$," a single scanning line is extracted from the three scanning lines by calculating the digital parallel video signal $K_n$ in accordance with the following equation:

$$K_n = (L_{n-1} + 2L_n + L_{n+1})/4 \qquad (1)$$

Accordingly, when the first digital parallel video signal $L_{n-1}$ from among three successive scanning lines 10 is inputted from the S/P converter 13 to the vertical filter circuit 20, only the first write selector $31_1$ is selected in accordance with the write select signal described above. Consequently, the first digital parallel video signal $L_{n-1}$ is stored into the first line memory $32_1$. When the second digital parallel video signal $L_n$ is inputted from the S/P converter 13 to the vertical filter circuit 20, only the second write selector $31_2$ is selected in accordance with the write select signal so that the second digital parallel video signal $L_n$ is stored into the second line memory $32_2$. When the third digital parallel video signal $L_{n+1}$ is inputted from the S/P converter 13 to the vertical filter circuit 20, none of the write selectors $31_1$–$31_3$ is selected so that the third digital parallel video signal $L_{n+1}$ is inputted to the calculation circuit 22 by way of the shifter 21.

Thereafter, the first read selector $33_1$ and the second read selector $33_2$ are selected in accordance with the read select signal described above so that the first digital parallel video signal $L_{n-1}$ stored in the first line memory $32_1$ and the second digital parallel video signal $L_n$ stored in the second line memory $32_2$ are inputted to the calculation circuit 22 by way of the first shifter $34_1$ and the second shifter $34_2$, respectively. In this instance, in order to effect the averaging process represented by equation (1) above, the first digital parallel video signal $L_{n-1}$ is inputted to the calculation circuit 22 without being shifted by the first shifter $34_1$, while the second digital parallel video signal $L_n$ is shifted right one bit position by the second shifter $34_2$ to double it and then inputted to the calculation circuit 22. The third digital parallel video signal $L_{n+1}$ is inputted to the calculation circuit 22 without being shifted by the shifter 21. In the calculation circuit 22, the digital parallel video signals $L_{n-1}$, $L_n$ and $L_{n+1}$, which are inputted from the first shifter $34_1$, the second shifter $34_2$, and the shifter 21, respectively, are added for each picture element and then multiplied by ¼ to make the digital parallel video signal $K_n$ which represents the image data for the sub-picture. The digital parallel video signal $K_n$ is outputted to the outside by way of the buffer memory 23.

It is to be noted that, in order to produce the image data for the sub-picture reduced to one ninth in size in relation to the vertical direction of the screen, only one of every three adjacent scanning lines should be extracted. Accordingly, the first and second delay circuits $30_1$, $30_2$ are used. However, in order to produce image data for a sub-picture reduced in size to one sixteenth in relation to the vertical direction of the screen, one of every four successive scanning lines should be extracted. In this case, all of the first to third delay circuits $30_1$–$30_3$ are used. On the other hand, in order to produce image data for a sub-picture reduced to one fourth in size in relation to the vertical direction of the screen, one of every successive two scanning lines should be extracted. In this case, only the first delay circuit $30_1$ is used.

As described above, the vertical filter circuit 20 comprising the three delay circuits $30_1$–$30_3$ can produce the image data for sub-pictures reduced to one fourth, one ninth, and one sixteenth in size. However, since the number of delay circuits depends on the size of the sub-picture, when producing LSI chips, there is a problem that a large area is required for line memories and signal lines, and consequently a large chip size is required. In order to produce the image data for a sub-picture reduced to one ninth in size, the averaging process is not performed until after all of the digital parallel video signals $L_{n-1}$, $L_n$ and $L_{n+1}$ of the three successive scanning lines are inputted to the vertical filter circuit 20. Accordingly, there is another problem that much time is required to produce the image data for the sub-picture.

SUMMARY OF THE INVENTION

An object of the present invention is to provide a vertical filter circuit which can reduce of the number of line memories necessary for the averaging process and increase the speed of the averaging process.

Other objects of the present invention will become obvious from the following description.

In accordance with an aspect of the present invention, there is provided a vertical filter circuit which effects an averaging process for video data of a plurality of successive scanning lines to produce image data for a sub-picture comprising: calculation means for receiving the video data from the outside and effecting the averaging process of the video data; first line memory provided in parallel to the calculation means and feeding an output signal of the calculation means back to the calculation means; and second line memory provided in parallel to the calculation means and feeding the output signal of the calculation means back to the calculation means.

BRIEF DESCRIPTION OF THE DRAWINGS

The features and advantages of the present invention will become apparent from the following description when taken in conjunction with the accompanying drawings in which.

DESCRIPTION OF THE PREFERRED EMBODIMENT

Figure 1:
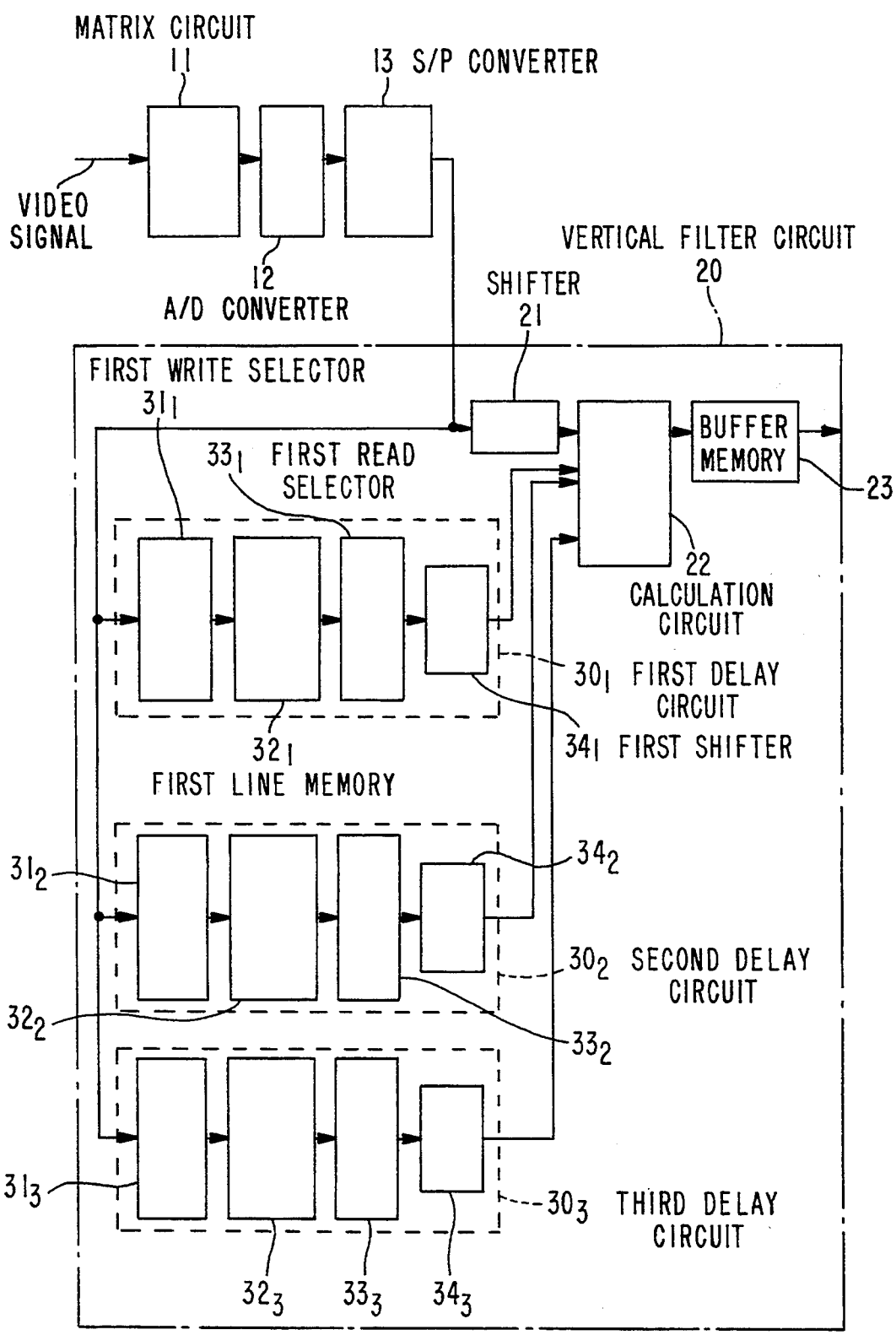
FIG. 1 is a block diagram showing the construction of a conventional vertical filter circuit.
Figure 2:
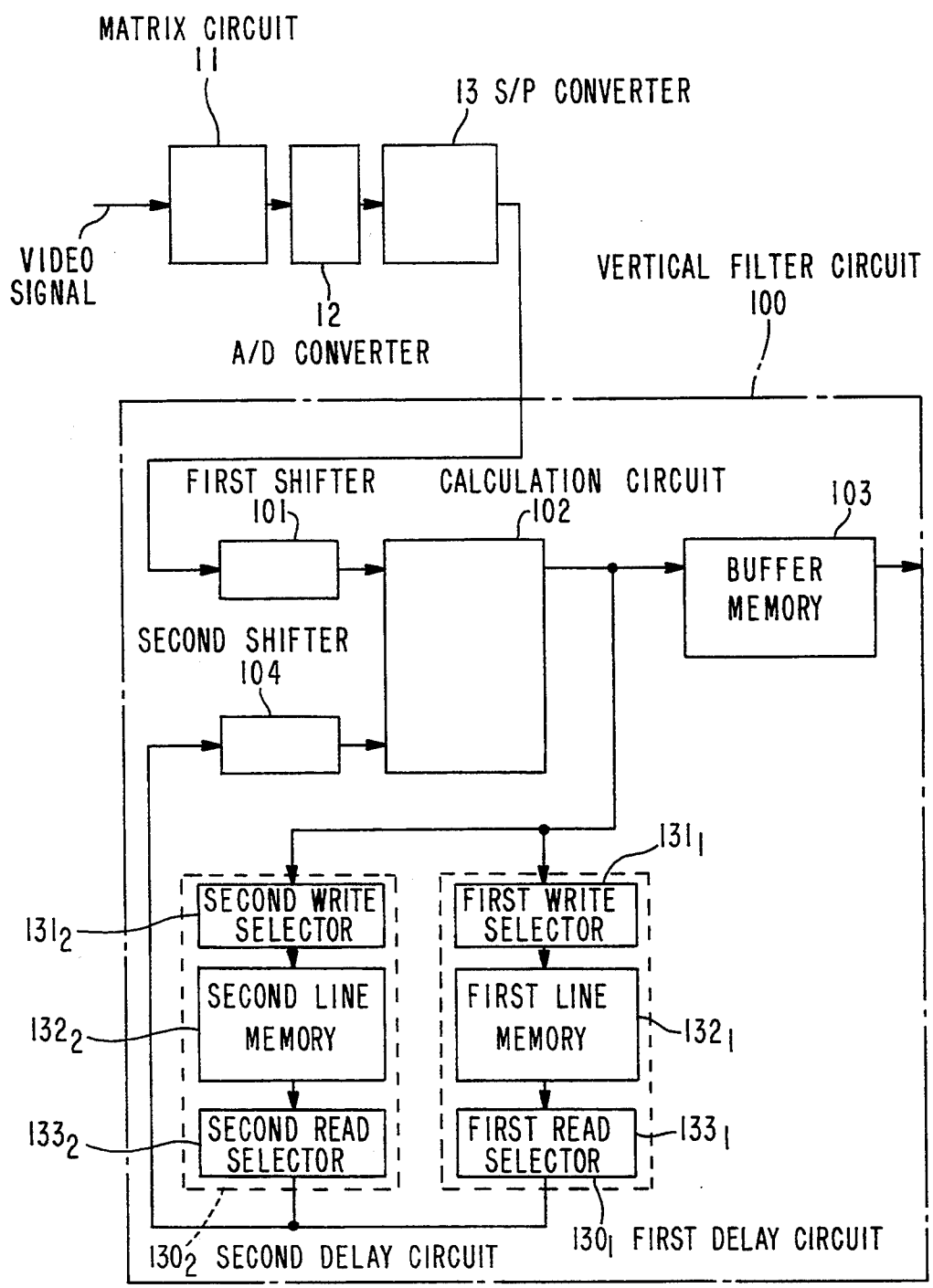
FIG. 2 is a block diagram showing the construction of a vertical filter circuit of an embodiment of the present invention.

A vertical filter circuit 100 which is an embodiment of the present invention comprises, as shown in FIG. 2, a first shifter 101, a calculation circuit 102, a buffer memory 103, a first delay circuit $130_1$, a second delay circuit $130_2$, and a second shifter circuit 104. Here, the first shifter 101 is connected to the S/P converter 13. The calculation circuit 102 is connected to the first shifter 101 and the second shifter 104. The buffer memory 103 is connected to the calculation circuit 102. Each of the first and second delay circuits $130_1$, $130_2$ is connected to the calculation circuit 102. The second shifter circuit 104 is connected to the first and second delay circuits $130_1$, $130_2$. The first delay circuit $130_1$ comprises a first write selector $131_1$, a first line memory $132_1$, and a first read selector $133_1$, all of which are connected in series. The second delay circuit $130_2$ comprises a second write selector $131_2$, a second line memory $132_2$, and a second read selector $133_2$, all of which are connected in series.

The first shifter 101 comprises a shift register and shifts a digital parallel video signal received from the S/P converter 13 the number of bit positions corresponding to the reduction ratio of the sub-picture in order to allow the averaging process which is required when image data for the sub-picture is to be produced. The second shifter 104 comprises a shift register with a resetting function and shifts a digital parallel video signal received from the first delay circuit $130_1$ or the second delay circuit $130_2$ the number of bit positions corresponding to the reduction ratio of the sub-picture in order to allow the averaging process. The calculation circuit 102 is used to effect the calculation necessary for the production of the image data for the sub-picture using the digital parallel video signals which are received from the first and second shifters 101, 104. The buffer memory 103 is used to temporarily store the image data for the sub-picture which is outputted from the calculation circuit 102.

Each of the write selectors 131₁, 131₂ comprises the number of clocked inverters greater by two than the number of bits of the digital parallel video signal, and one of the write selectors 131₁, 131₂ is selected in accordance with a write select signal (not shown) inputted from the outside. Each of the line memories 132₁, 132₂ is used to store a digital parallel video signal for one scanning line received from the calculation circuit 102. Each of the read selectors 133₁, 133₂ comprises the number of clocked inverters greater by two than the number of bits of the digital parallel video signal, and one of the read selectors 133₁, 133₂ is selected in accordance with a read select signal (not shown) inputted from the outside.

Next will be described the operation in which the vertical filter circuit 100 is used to produce image data for a sub-picture reduced to one ninth in size.

When a first digital parallel video signal $L_{n-1}$ of the first of three successive scanning lines is inputted from the S/P converter 13, it is inputted to the calculation circuit 102 without being shifted by the first shifter 101. In this instance, since the second shifter 104 is in a reset state, the input value from the second shifter 104 to the calculation circuit 102 is "0." Meanwhile, only the first write selector 131₁ is selected in accordance with the write select signal. Accordingly, the first digital parallel video signal $L_{n-1}$ inputted from the calculation circuit 102 is stored into the first line member 132₁ by way of the first write selector 131₁.

When the second digital parallel video signal $L_n$ of the second scanning line is inputted from the S/P converter 13, it is shifted right by one bit position by the first shifter 101, causing it to be doubled, and is thereafter inputted to the calculation circuit 102. In this instance, the first read selector 133₁ is selected in accordance with the read select signal so that the first digital parallel video signal $L_{n-1}$ stored in the first light memory 132₁ is inputted to the second shifter 104. The first digital parallel video signal $L_{n-1}$ is inputted to the calculation circuit 102 without being shifted by the second shifter 104. In the calculation circuit 102, the addition of the second digital parallel video signal $L_n$ received from the first shifter 101 and the first digital parallel video signal $L_{n-1}$ received from the second shifter 104 is performed for each picture element. In this instance, since the second write selector 131₂ is selected in accordance with the write select signal, the digital parallel video signal added by the calculation circuit 102 is stored into the second line memory 132₂ by way of the second write selector 131₂. As a result, the digital parallel video signal represented by $L_{n-1}+2L_n$ is stored into the second line memory 132₂.

Subsequently, when the third digital parallel video signal $L_{n+1}$ of the third scanning line is inputted from the S/P converter 13, it is inputted to the calculation circuit 102 without being shifted by the first shifter 101. In this instance, the second read selector 133₂ is selected in accordance with the read select signal so that the digital parallel video signal stored in the second line memory 132₂ is inputted to the second shifter 104. The digital parallel video signal is inputted to the calculation circuit 102 without being shifted by the second shifter 104. In the calculation circuit 102, the third parallel video signal $L_{n+1}$ received from the first shifter 101 and the digital parallel video signal received from the second shifter 104 are added, and the sum is then multiplied by ¼. As a result, the averaging process in accordance with equation (1) above is performed by the calculation circuit 102 to produce the digital parallel video signal $K_n$ which represents the image data for the sub-picture. The digital parallel video signal $K_n$ is outputted to the outside by way of the buffer memory 103.

The vertical filter circuit 100 can thus produce image data for a sub-picture irrespective of its size since either of the first and second delay circuits 130₁, 130₂ can be used as a writing delay circuit and the other can be used as a reading delay circuit because the first and second delay circuits 130₁, 130₂ are provided at the output end of the calculation circuit 102 and the digital parallel video signal outputted from the first or second delay circuit 130₁, 130₂ is fed back to the calculation circuit 102.

It is to be noted that, in order to produce image data for a sub-picture having a reduction ratio of one fourth, the averaging process should be performed in accordance with the following equation in order to produce a digital parallel video signal $K_n$ in a manner similar to the above process:

$$K_n = (L_{n-1} + L_n) \quad (2)$$

On the other hand, in order to produce image data for a sub-picture having a reduction ratio of one sixteenth, the averaging process should be performed in accordance with the following equation in order to produce a digital parallel video signal $K_n$ in a manner similar to the above process:

$$K_n = (L_{n-1} + L_n + L_{n+1} + L_{n+2})/4 \quad (3)$$

In the foregoing description, the digital parallel video signal $K_n$ having a reduction ratio of one ninth is produced by an averaging process in accordance with equation (1) above, but the averaging process may alternatively be performed in accordance with the following equation to produce the digital parallel video signal $K_n$ in a similar manner:

$$K_n = L_{n-1}/4 + L_n/2 + L_{n+1}/4 \quad (4)$$

In this instance, at each of the first and second shifters 101, 104, the inputted digital parallel video signal should be shifted left a respective predetermined number of bits in order to effect the averaging process in accordance with equation (4) above.

Further, while the first and second shifters 101, 104 are provided at the input ends of the calculation circuit 102, the calculation circuit 102 may alternatively have the functions of the first and second shifters 101, 104. Meanwhile, when the matrix circuit 11 is not employed, three vertical filter circuits may alternatively be provided to which the brightness signal and two color difference signals are inputted respectively to produce image data for the sub-picture.

While the present invention has been described in conjunction with the preferred embodiments thereof, it will now readily be possible for those skilled in the art to put the present invention into practice in various other manners.

What is claimed is:

1. A vertical filter circuit for performing an averaging operation on digital video data of a plurality of successive scanning lines in order to produce image data for a sub-picture, said vertical filter comprising:

a calculation circuit having two input nodes and an output node, a first of said input nodes being supplied with first video data, a second of said input nodes being supplied with second video data, said calculation circuit performing an averaging operation on said first and second video data in order to produce output video data at said output node, said output video data being derived by said averaging operation performed on said first and second digital data;

supplying means responsive to said digital video data for providing data relative to digital video data of each of said scanning lines to said first input node of said calculation circuit as said first video data;

a first line memory;

a second line memory;

a write selector circuit coupled to said output node of said calculation circuit and to said first and second line memories for writing said output video data alternately into said first and second line memories; and a read selector circuit coupled to said second input node of said calculation circuit and to said first and second line memories for reading data stored therein alternately from said first and second line memories and for supplying data read from a selected one of said first and second line memories to said second input node of said calculation circuit as said second video data;

the output video data produced by said calculation circuit responsive to performing said averaging operation on one of said digital video data of a plurality of successive scanning lines and data read from one of said first and second line memories selected by said read selector circuit is written into the other of said first and second line memories through a selection by said write selector circuit.

2. The vertical filter circuit as claimed in claim 1, wherein said supplying means comprises a first shifter for shifting the digital video data of each of said scanning lines to produce said first video data.

3. The vertical filter circuit as claimed in claim 2, further comprising a second shifter coupled between said second input node of said calculation circuit and said read selection circuit to produce said second video data.

4. A vertical filter circuit for producing image data for a sub-picture in response to video data for an original picture, said video data for said original picture being divided into a plurality of groups each having digital video data of at least successive first, second and third scanning lines, said vertical filter circuit comprising:

an input terminal for receiving said video data for said original picture;

a calculation circuit having a first input node, a second input node, and an output node, a first shifter coupled between said input terminal and said first input node of said calculation circuit for shifting each of said digital video data of said successive first, second, and third scanning lines to produce and supply successively first, second, and third shifted video data to said first input node of said calculation circuit;

a buffer memory coupled to said output node of said calculation circuit;

a first line memory coupled between said output node and said second input node of said calculation circuit; and a second line memory coupled between said output node and said second input node of said calculation circuit;

said calculation circuit accessing said first line memory to write said first shifted video data into said first line memory through said output node thereof, accessing said first line memory to read said first shifted video data from said first line memory to said second input node thereof, performing a first averaging operation on said first shifted video data at said second input node and said second shifted video data at said first input node to produce first averaged video data at said output node, accessing said second line memory to write said first averaged video data into said second line memory, accessing said second line memory to read said first averaged video data from said second line memory to said second input node, performing a second averaging operation on said first averaged video data at said second input node and said third shifted video data at said first input node to produce a resultant data, and accessing said buffer memory to write said resultant data into said buffer memory.

5. The vertical filter circuit as claimed in claim 4, wherein said first line memory includes a first write selector coupled between said first line memory and said output node of said calculation circuit, said first write selector responding to an activation thereof by enabling said calculation circuit to write a data on said first line memory, and a first read selector coupled between said first line memory and said second input node of said calculation circuit, said first read selector responding to an activation thereof by enabling said calculation circuit to read a data on said first line memory, and said second line memory includes a second write selector coupled between said second line memory and said output node of said calculation circuit, said second write selector responding to an activation thereof by enabling said calculation circuit to write a data on said second line memory, and a second read selector coupled between said second line memory and said second input node of said calculation circuit, said second read selector responding to an activation thereof by enabling said calculation circuit to read a data read operation on said second line memory.

* * * * *